United States Patent [19]

Langfeld et al.

[11] Patent Number: 5,196,518
[45] Date of Patent: Mar. 23, 1993

[54] PROCESS FOR THE PREPARATION OF METALLISABLE AZO DYES BY CARRYING OUT THE COUPLING IN THE PRESENCE OF A BUFFER MIXTURE

[75] Inventors: Horst Langfeld; Claudio Puebla, both of Grenzach-Wyhlen; Günter Sereinig, Schopfheim, all of Fed. Rep. of Germany

[73] Assignee: Ciba-Geigy Corporation, Ardsley, N.Y.

[21] Appl. No.: 758,327

[22] Filed: Aug. 28, 1991

Related U.S. Application Data

[63] Continuation of Ser. No. 486,343, Feb. 28, 1990, abandoned, which is a continuation-in-part of Ser. No. 237,474, Aug. 19, 1988, Pat. No. 5,026,830.

[30] Foreign Application Priority Data

Sep. 8, 1987 [CH] Switzerland ............ 3447/87
Mar. 2, 1989 [DE] Fed. Rep. of Germany ....... 3906664

[51] Int. Cl.$^5$ .................. C09B 41/00; C09B 29/02
[52] U.S. Cl. .................. 534/583; 534/581; 534/582; 534/602; 534/780; 534/841; 534/842; 534/843
[58] Field of Search .............. 534/581-583, 534/602, 780, 841-843

[56] References Cited

U.S. PATENT DOCUMENTS

| | | | |
|---|---|---|---|
| 2,589,955 | 3/1952 | Neier et al. | 534/581 X |
| 2,659,720 | 11/1953 | Kuster | 534/583 X |
| 2,812,321 | 11/1957 | Eberhart et al. | 534/780 X |
| 3,948,879 | 4/1976 | Dore | 534/582 |
| 4,996,303 | 2/1991 | Puntener et al. | 534/602 |
| 5,026,830 | 6/1991 | Langfeld et al. | 534/602 X |

FOREIGN PATENT DOCUMENTS

| | | | |
|---|---|---|---|
| 187621 | 7/1986 | European Pat. Off. | 534/583 |
| 3808817 | 9/1988 | Fed. Rep. of Germany | 534/842 |
| A812374 | 7/1936 | France . | |
| A151003 | 9/1981 | German Democratic Rep. . | |
| 61-254550 | 11/1986 | Japan | 534/842 |
| 1205479 | 9/1970 | United Kingdom . | |
| 1350297 | 4/1974 | United Kingdom . | |

OTHER PUBLICATIONS

Fierz-David, H. "Fundamental Processes of Dye Chemistry"; Interscience Publishers, New York (1949) p. 251.
Franke et al., *Chemical Abstracts*, vol. 105, No. 228492j (1986).
Zollinger, H. "Azo and Diazo Chemistry", Interscience Publishers, New York (1961) p. 250.
Kamichi et al. Chemical Abstracts, vol. 106, No. 178104g (1987).
C. Synowietz and K. Schaffer, Chemiker Kalender, Springer Verlag (1984) pp. 534–538.

*Primary Examiner*—Mary C. Lee
*Assistant Examiner*—Fiona T. Powers
*Attorney, Agent, or Firm*—Marla J. Mathias; Edward McC. Roberts

[57] ABSTRACT

A process for the preparation of azo dyes of formula

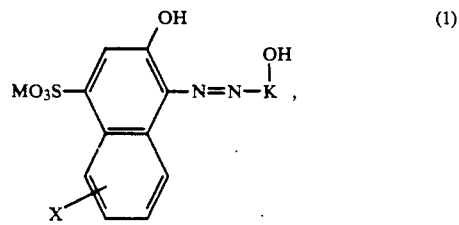

wherein K is the radical of a coupling component of the benzene or naphthalene series or of the heterocyclic series, and the hydroxy group is attached to K adjacent to the azo group, X is hydrogen or nitro and M is an alkali metal ion, which process comprises coupling a diazo component of formula

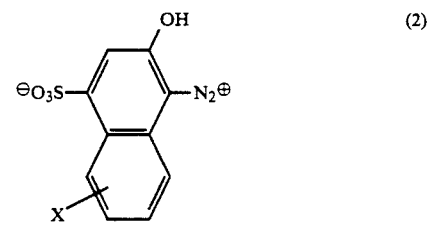

in the presence of one or more buffer mixtures and in the absence or presence of an alkali metal chloride, to a coupling component of formula

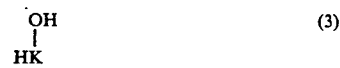

in which formulae (2) and (3) K and X are as defined for formula (1).

The present invention makes it possible to prepare the azo dyes in high yields.

18 Claims, No Drawings

PROCESS FOR THE PREPARATION OF METALLISABLE AZO DYES BY CARRYING OUT THE COUPLING IN THE PRESENCE OF A BUFFER MIXTURE

This application is a continuation of Ser. No. 486,343, filed Feb. 28, 1990, now abandoned, which in turn is a continuation-in-part of Ser. No. 237,474, filed Aug. 29, 1988, now U.S. Pat. No. 5,026,830, issued Jun. 25, 1991.

The coupling of 1-diazo-2-hydroxynaphthalene-4-sulfonic acid or of the corresponding component containing a nitro group with a coupling component of the benzene, naphthalene or heterocyclic series containing a hydroxyl group in the position adjacent to the coupling position proceeds slowly and with unsatisfactory yields in certain cases.

In recent years attempts have been made on an increasing scale to automatize and to optimize processes for the preparation of dyes and intermediate products thereof, not only in regard to the process of preparation, but also in respect of the working-up. In order to obtain satisfactory results in this field, one is dependent on processes which are characterized by the following criteria: the yields as quantitative as possible, with reproducibly good quality, reactions with as few working-up stages as possible and rapid reactions which make possible a large number of reactions per time unit.

The process, according to the invention, for the preparation of azo dyes of the formula

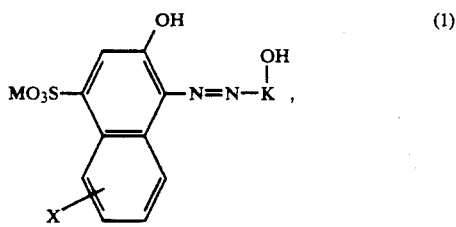

in which K is the radical of a coupling component of the benzene or naphthalene series or of the heterocyclic series in which the hydroxyl group is attached to K in the position adjacent to the azo group, X is hydrogen or nitro and M is an alkali metal ion or ammonium ion, comprises coupling a diazo component of the formula

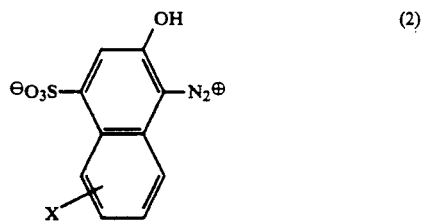

in the presence of an alkali metal chloride and ammonium chloride with a coupling component of the formula

K and X in the formulae (2) and (3) being as defined under formula (1).

The coupling of compounds of the formula (2) with compounds of the formula (3) is known to be difficult. Consequently, attempts have been made to improve the yield by using various catalysts, for example in the presence of zinc salts or in the presence of calcium or magnesium salts, or by coupling under an atmosphere of nitrogen. Zinc salts improve the yield, as also do calcium and magnesium salts; a disadvantage is the disturbance caused by the salt content after the reaction is complete, which generally requires intermediate precipitation of the azo dye formed. Working under an atmosphere of nitrogen requires special apparatus.

It is surprising that the process according to the invention produces a marked increase of yield in the coupling reaction in the presence of a mixture of alkali metal chloride and ammonium chloride, that the azo dyes obtained can be processed further directly without intermediate precipitation, and that the reaction is virtually complete even after a very short time. The very short reaction time should be singled out as an important characteristic of the process according to the invention. The reaction is complete even after a few minutes, as a rule after 5 to 10 minutes, which ensures a large conversion per time unit. Furthermore, no pollution of the effluent by heavy metal salts or sparingly soluble salts is caused by the procedure according to the invention.

Lithium chloride, sodium chloride or potassium chloride are advantageously used in the process according to the invention as the alkali metal chloride. In accordance with a preferred embodiment of the process according to the invention, sodium chloride is used as the alkali metal chloride.

The amount of alkali metal chloride and ammonium chloride which can be used in the process according to the invention can vary within wide limits; in general, a 5-molar to 15-molar amount of alkali metal chloride and ammonium chloride, particularly sodium chloride and ammonium chloride, relative to the molar amount of the diazo component of the formula (2), has proved advantageous.

A preferred embodiment of the process according to the invention comprises using an 8-molar to 10-molar amount of alkali metal chloride and ammonium chloride.

The ratio of alkali metal chloride to ammonium chloride can vary within wide limits; in general, a molar ratio of 5:1 to 15:1, i.e. 5 moles of alkali metal chloride to 1 mole of ammonium chloride to 15 moles of alkali metal chloride to 1 mole of ammonium chloride, has proved advantageous. A preferred embodiment of the process according to the invention comprises using a molar ratio of alkali metal chloride to ammonium chloride of 8:1 to 10:1.

The coupling reaction between the compound of the formula (2) and the compound of the formula (3) is carried out in aqueous solution. A value between 8.5 and 11.5 has proved a suitable pH for the coupling. The diazo component of the formula (2), which is present in an acid form, is advantageously first adjusted to a pH of approx. 7 with alkali metal hydroxide before the coupling and is only adjusted to the pH value between 8.5 and 11.5, in particular between 9 and 10, appropriate to the coupling immediately before coupling, it being advantageous to make this adjustment by means of ammonia or aqueous ammonia solution, for example a 10% to 30% aqueous solution; preferably the solution contains 22 to 28 per cent by weight of ammonia.

A particularly preferred embodiment of the process according to the invention comprises adding alkali metal chloride and ammonium chloride, in particular a 5-molar to 15-molar amount, preferably an 8-molar to 10-molar amount, using a molar ratio of alkali metal chloride to ammonium chloride of 5:1 to 15:1, in particular 8:1 to 10:1, to the compound of the formula (2), neutralizing the solution and, immediately before coupling, adjusting the pH to a value between 8.5 and 11.5, in particular between 9 and 10, by means of ammonia or an aqueous solution of ammonia, and then running the mixture as rapidly as possible, at an initial temperature of at least 40° C., into the solution of the coupling component of the formula (3) which has been adjusted by means of alkali metal hydroxide to a pH between 9 and 13.

The molar ratio of the diazo component of the formula (2) to the coupling component of the formula (3) is 0.8:1.2 to 1.2:0.8, in particular 0.95:1.05 to 1.05:0.95.

Another preferred embodiment of the process according to the invention comprises carrying out coupling at a temperature of at least 40° C., in particular between 40° and 75° C. In particular, the coupling is carried out adiabatically, an initial temperature of at least 40° C. having proved especially advantageous.

A particularly important embodiment of the process according to the invention comprises coupling, in aqueous solution, a diazo component of the formula (2) in the presence of a 5-molar to 15-molar amount, relative to the molar amount of the diazo component, of an alkali metal chloride and ammonium chloride, at a pH adjusted by means of ammonia to between 8.5 and 11.5, in particular between 9.0 and 10.5, with a coupling component of the formula (3).

After the completion of coupling the azo dye of the formula (1) can, without further purification, be processed further directly, for example by metallization to give a metal complex dye. If the dye of the formula (1) is to be isolated, it has proved advantageous to heat the coupling composition briefly, for example to a temperature of 60° to 90° C., as a result of which a readily filterable form of the coupling product is obtained.

The diazo components of the formula (2) which can be employed by the process according to the invention are, in particular, 1-diazo-2-hydroxynaphthalene-4-sulfonic acid and 1-diazo-6-nitro-2-hydroxynaphthalene-4-sulfonic acid. The diazo components of the formula (2) are known and are prepared by known processes.

The coupling components of the formula (3) are known and are prepared by known processes. It is preferable to employ, in the process according to the invention, coupling components which belong to the benzene or naphthalene series or to the 5-pyrazolone, hydroxyquinoline or acetoacetoarylide or benzoylacetic acid series.

Apart from the hydroxyl group, the following substituents can also be present in the coupling components of the formula (3): $C_1-C_6$alkyl, $C_1-C_6$alkoxy, $C_2-C_6$-alkanoylamino, $C_1-C_6$alkoxycarbonylamino, halogen, sulfo, sulfonamide and sulfone groups.

Examples of suitable $C_2-C_6$alkanoylamino groups are acetylamino, propionylamino and butyrylamino.

Examples of suitable $C_1-C_6$alkoxycarbonylamino groups are methoxycarbonylamino and ethoxycarbonylamino.

Examples of suitable $C_1-C_6$alkyl groups are methyl, ethyl, propyl, isopropyl, butyl, sec-butyl, tert-butyl, isobutyl, pentyl and hexyl.

Examples of suitable $C_1-C_6$alkoxy groups are methoxy, ethoxy, propoxy, isopropoxy and butoxy.

Examples of suitable halogens are fluorine, bromine and especially chlorine.

Examples of suitable sulfonamido groups are —$SO_2NH_2$ and $SO_2NHC_1-C_6$alkyl, for example $SO_2NHCH_3$ and —$SO_2NHC_2H_5$ and —$SO_2N(C_1-C_6$alkyl$)_2$, for example —$SO_2N(CH_3)_2$ and —$SO_2N(C_2H_5)_2$ and also

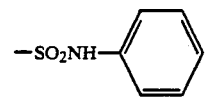

in which the phenyl radical can be substituted, for example by sulfo or carboxyl.

Examples of suitable sulfone groups are —$SO_2$—$C_1-C_6$alkyl, such as —$SO_2$—$CH_3$, and —$SO_2$aryl, such as phenylsulfonyl.

In a particularly preferred embodiment of the process according to the invention, use is made of coupling components of the formula(3) in which K is a benzene, naphthalene or 1-phenyl-3-methylpyrazol-5-one radical which can contain one to three of the substituents mentioned above; in particular K is the naphthyl radical.

An embodiment of the process according to the invention which is very particularly preferred comprises using, as the coupling component of the formula(3), 1-naphthol, 2-naphthol, 5,8-dichloro-1-naphthol, 1-naphthol-5-sulfonic acid, 8-acetylamino-2-naphthol, 6-acetylamino-2-naphthol-4-sulfonic acid, 1-phenyl-3-methylpyrazol-5-one, 6-amino-1-naphthol-3-sulfonic acid or 4-tert-butylphenol.

Coupling components which are particularly suitable are phenols which are substituted by $C_1-C_6$alkyl and/or $C_1-C_6$alkanoylamino, $C_1-C_6$-alkoxycarbonylamino, and particularly naphthols which are unsubstituted or substituted by chlorine, $C_2-C_6$alkanoylamino, $C_1-C_6$-alkoxycarbonylamino, sulfo, sulfonamide or sulfone groups, for example 4-methylphenol, 4-t-butylphenol, 2,4-dimethylphenol, 2-acetylamino-2-methylphenol, 1-naphthol, 2-naphthol, 1-naphthol-3-, -4- or -5-sulfonic acid, 2-naphthol-3-, -4-, -5-, -6-, -7- or -8-sulfonic acid, 2-naphthol-6-sulfamide, 1-acetylamino-7-naphthol, 1-acetylamino-6-naphthol, 1-propionylamino-7-naphthol, 1-carbomethoxyamino-7-naphthol, 5,8-dichloro-1-naphthol, 2-acetylamino-6-naphthol-8-sulfonic acid, 1-phenyl-3-methylpyrazol-5-one and 6-amino-1-naphthol-3-sulfonic acid.

A particularly interesting embodiment of the process according to the invention comprises adding an 8-molar to 10-molar amount of sodium chloride and ammonium chloride, the molar ratio of sodium chloride to ammonium chloride being 8:1 to 10:1, to 1-diazo-6-nitro-2-hydroxynaphthalene-4-sulfonic acid in aqueous solution, neutralizing the solution with NaOH and, immediately before coupling, adjusting the pH with aqueous ammonia solution to a value between 9 and 10, and then, as rapidly as possible, at an initial temperature of 40° C. running this solution into a solution of β-naphthol, the pH of which has been adjusted by means of alkali to a value between 11 and 13. The coupling takes place adiabatically and is complete after 5 to 10 minutes. The azo dye can be processed further directly without isolation or can be isolated by filtration after heating at 70° to 80° C for a short period.

The azo dyes obtained by the process according to the invention are suitable for the preparation of metal complex dyes, for example chromium or cobalt complex azo dyes, the metallization being carried out by methods known per se.

In the following example parts are parts by weight. The temperatures are degrees centigrade. The relationship between parts by weight and parts by volume is the same as that between grams and cubic centimeters.

EXAMPLE 1

3 parts of ammonium chloride and 14,75 parts of 1-diazo-6-nitro-2-hydroxy-naphthalene-4-sulfonic acid are introduced into 150 parts of water. 20 parts of sodium chloride are then added and the pH is adjusted to the neutral point by means of an aqueous solution of NaOH (50%). In the course of this the temperature rises to approx. 42°. 6 parts of a 25% aqueous ammonia solution are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 7.5 parts of sodium chloride are then added. The reaction mixture is immediately stirred vigorously, in the course of which a temperature of approx. 50° is set up and the pH falls to a value between 9.3 and 9.5. Coupling is complete after 5 to 10 minutes. The pH of the coupling product is adjusted to a value of 7 with 32% hydrochloric acid and it is filtered off at 80°. The yield is approx. 92% of theory.

If an equimolar amount 1-diazo-2-hydroxynaphthalene-4-sulfonic acid is used instead of 1-diazo-6-nitro-2-hydroxynaphthalene-4-sulfonic acid, a dye is obtained at a similarly high yield in a comparably short dwell time in the coupling kettle.

The resulting dyes can be processed further to give the metal complex directly, without intermediate precipitation or without purification, i.e. the adjustment of the pH to the neutral point, heating to 80° and filtration are superfluous.

EXAMPLE 2

2.5 parts of ammonium chloride and 14.75 parts of 1-diazo-6-nitro-2-hydroxynaphthalene-4-sulfonic acid are introduced into 150 parts of water. 24 parts of sodium chloride are then added and the pH is adjusted to the neutral point by means of a 50% aqueous solution of NaOH. In the course of this the temperature rises to approx. 42°. 6 parts of a 25% aqueous ammonia solution are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 10 parts of sodium chloride are then added. The reaction mixture is immediately stirred vigorously, a temperature of approx. 65° is set up and the pH is adjusted to a value between 8.6 and 9.0. Coupling is complete after 5 to 10 minutes. The pH of the coupling product is adjusted to a value of 7 with 32% hydrochloric acid and it is filtered off at 80°. The yield is approx. 92% of theory.

EXAMPLE 3

2.65 parts of ammonium chloride and 14,75 parts of 1-diazo-6-nitro-2-hydroxynaphthalene-4-sulfonic acid are introduced into 150 parts of water. 14 parts of sodium chloride are then added and the pH is adjusted to the neutral point by means of a 50% aqueous solution of NaOH. In the course of this the temperature rises to approx. 42°. 6 parts of a 25% aqueous solution of ammonia are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 1.95 parts of sodium chloride are then added. The reaction mixture is immediately stirred vigorously, a temperature of approx. 42° is set up and the pH is adjusted to a value between 10.3 and 10.6. Coupling is complete after 5 to 10 minutes. The pH of the coupling product is adjusted to a value of 7 with 32% hydrochloric acid and it is filtered off at 80°. The yield is approx. 92% of theory.

EXAMPLE 4

1.8 parts of ammonium chloride and 14.75 parts of 1-diazo-6-nitro-2-hydroxynaphthalene-4-sulfonic acid are introduced into 150 parts of water. 20 parts of sodium chloride are then added and the pH is adjusted to the neutral point by means of a 50% aqueous solution of NaOH. In the course of this the temperature rises to approx. 42°. 6 parts of a 25% aqueous solution of ammonia are then added, followed immediately by a solution prepared as follows: 7.5 parts of 2-naphthol are introduced into 50 parts of water heated to 60° and are dissolved by means of 2.5 parts of NaOH, in the course of which a pH of approx. 12 is set up, and 7.5 parts of sodium chloride are then added. The reaction mixture is immediately stirred thoroughly, a temperature of approx. 55° is set up and the pH is adjusted to a value between 9.1 and 9.3. Coupling is complete after 5 to 10 minutes. The pH of the coupling product is adjusted to 7 with 32% hydrochloric acid and it is filtered off at 80°. The yield is approx. 92% of theory.

If the procedure indicated in Examples 1 to 4 is repeated, except that an equimolar amount of the diazo components indicated in column 2 of the following table is used as the diazo component and an equimolar amount of the coupling components indicated in column 3 of the following table is used instead of the coupling component, with an otherwise similar procedure, high yields of monoazo dyes are obtained which can be processed further to give the metal complex directly without intermediate precipitation or without purification.

TABLE

| Example | Diazo component | Coupling component |
|---|---|---|
| 5 | 3-hydroxy-4-diazo-1-naphthalenesulfonate | 1-naphthol |
| 6 | 3-hydroxy-4-diazo-1-naphthalenesulfonate | 1-hydroxy-4,5-dichloronaphthalene |
| 7 | 3-hydroxy-4-diazo-1-naphthalenesulfonate | 5-hydroxy-naphthalene-1-sulfonic acid |
| 8 | 3-hydroxy-4-diazo-1-naphthalenesulfonate | 1-acetamido-7-hydroxynaphthalene |
| 9 | 3-hydroxy-4-diazo-1-naphthalenesulfonate | 7-acetamido-3-hydroxynaphthalene-1-sulfonic acid |
| 10 | 3-hydroxy-4-diazo-1-naphthalenesulfonate | 1-phenyl-3-methyl-5-pyrazolone |
| 11 | 3-hydroxy-4-diazo-6-nitro-1-naphthalenesulfonate | 1-phenyl-3-methyl-5-pyrazolone |

TABLE-continued

| Example | Diazo component | Coupling component |
|---------|-----------------|--------------------|
| 12 | 4-sulfo-6-nitro-3-hydroxy-1-naphthalenediazonium | 1-naphthol |
| 13 | 4-sulfo-6-nitro-3-hydroxy-1-naphthalenediazonium | 5,8-dichloro-1-naphthol |
| 14 | 4-sulfo-6-nitro-3-hydroxy-1-naphthalenediazonium | 5-hydroxy-1-naphthalenesulfonic acid |
| 15 | 4-sulfo-6-nitro-3-hydroxy-1-naphthalenediazonium | 1-acetamido-7-hydroxynaphthalene |
| 16 | 4-sulfo-6-nitro-3-hydroxy-1-naphthalenediazonium | 7-acetamido-3-hydroxy-1-naphthalenesulfonic acid |
| 17 | 4-sulfo-3-hydroxy-1-naphthalenediazonium | 6-amino-4-hydroxy-2-naphthalenesulfonic acid |

TABLE-continued

| Example | Diazo component | Coupling component |
|---|---|---|
| 18 | ⁻O₃S— (naphthalene with OH, N₂⁺, O₂N) | HO₃S— (naphthalene with OH, NH₂) |
| 19 | ⁻O₃S— (naphthalene with OH, N₂⁺) | HO— phenol with C(CH₃)₃ |
| 20 | ⁻O₃S— (naphthalene with OH, N₂⁺, O₂N) | HO— phenol with C(CH₃)₃ |

The resulting dyes can be processed to give the metal complex directly without intermediate purification or without purification, i.e. the adjustment of pH to the neutral point, heating to 80° and filtration are superfluous.

The coupling of 1-diazo-2-hydroxynaphthalene-4-sulfonic acid, or of the corresponding component containing a nitro group, to a coupling component of the benzene, naphthalene or heterocyclic series which contains a hydroxy group adjacent to the coupling site, proceeds in some cases slowly and in unsatisfactory yield.

In recent years, increasing efforts have been made to automate and optimize processes for the preparation of dyes or their intermediates, both as regards the synthesis and the working up. To obtain satisfactory results, the dye manufacturer is dependent on processes to which the following criteria apply: substantially quantitative yield, reproducibly good quality, reactions with as few working up steps as possible, and fast reactions which permit a large number of reactions per unit of time.

The process of this invention for the preparation of azo dyes of formula

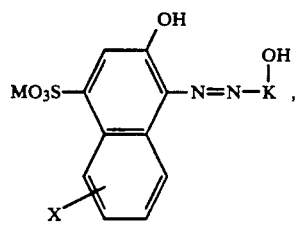 (1)

wherein K is the radical of a coupling component of the benzene or naphthalene series or of the heterocyclic series, and the hydroxy group is attached to K adjacent to the azo group, X is hydrogen or nitro and M is an alkali metal ion, comprises coupling a diazo component of formula

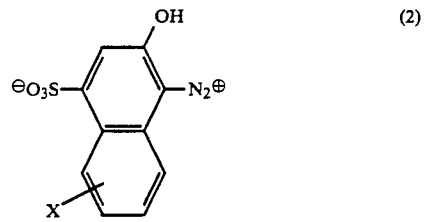 (2)

in the presence of one or more buffer mixtures, excepting the buffer mixture ammonium chloride/ammonia, and in the absence or presence of an alkali metal chloride, to a coupling component of formula

 (3)

in which formulae (2) and (3) K and X are as defined for formula (1).

Coupling compounds of formula (2) to compounds of formula (3) is known to be difficult. Attempts have therefore been made to improve the yield by using different catalysts, for example in the presence of zinc salts or in the presence of calcium or magnesium salts, or by coupling under nitrogen. Zinc salts improve the yield, as do also calcium and magnesium salts; but a drawback is the troublesome salt content after completion of the reaction, which usually necessitates a separation of the azo dye beforehand. Carrying out the reaction under nitrogen requires special apparatus.

It is surprising that the process of this invention effects a marked increase in yield if the coupling is carried out in the presence of one or more of the above mentioned buffer mixtures and in the absence or presence of an alkali metal chloride, and that the reaction is almost complete after a very short time.

The use of an alkali metal chloride in the process of this invention has been found useful when the coupling is carried out with coupling components of high $pK_{OH}$ values, for example naphthol.

A preferred embodiment of the process of this invention comprises carrying out the coupling in the presence of an alkali metal chloride.

The alkali metal chloride conveniently used in the process of this invention is lithium, sodium or potassium chloride. In a particularly preferred embodiment of the process of the invention, sodium chloride is used as alkali metal chloride.

The amount in which the alkali metal chloride may be used can vary within wide limits. The 5- to 15-fold molar amount of alkali metal chloride, preferably sodium chloride, based on the molar amount of the diazo component of formula (2), has generally been found useful.

In a preferred embodiment of the process of the invention the 6- to 9-fold amount of alkali metal chloride is used.

Buffer mixtures for the pH range from 8.5 to 11.5 have been found useful. The amount in which the buffer mixture may be used in the process of this invention can vary within a wide range. The 0.02- to 10-fold molar amount, preferably the 0.1- to 10-fold molar amount, of buffer mixture, based on the molar amount of the diazo component of formula (2), has generally been found advantageous.

As buffer mixture for the process of this invention it is preferred to use one or more buffer mixtures selected from the series consisting of disodium carbonate/sodium hydroxide, sodium hydrogen carbonate/sodium hydroxide, disodium hydrogen phosphate/sodium hydroxide, sodium dihydrogen phosphate/sodium hydroxide, borax/sodium hydroxide, borax/hydrochloric acid, sodium borate/sodium hydroxide, sodium borate/hydrochloric acid, borax/boric acid, disodium carbonate/boric acid, boric acid/sodium hydroxide, veronal sodium/hydrochloric acid, glycocoll/sodium hydroxide, tris(hydroxymethyl)aminomethane/hydrochloric acid, a Britton-Robinson stock solution/sodium hydroxide, a Teorell-Stenhagen stock solution/hydrochloric acid, and potassium dihydrogen phosphate/borax.

The Teorell-Stenhagen stock solution and the Britton-Robinson stock solution can be prepared in accordance with the particulars given in "Chemiker-Kalender", C. Synowietz and K. Schäfer, Springer Verlag (1984), page 536. The concentrations of the components of the buffer mixtures used in the process of this solution are chosen in particular such that the pH is in the range from 8.5 to 11.5.

If several buffer mixtures are used in the process of the invention, then it is preferred to use typically the following combinations:
 disodium carbonate/sodium hydroxide and sodium hydrogen carbonate/sodium hydroxide
 disodium hydrogen phosphate/sodium hydroxide and sodium dihydrogen phosphate/sodium hydroxide.

A preferred embodiment of the process of this invention comprises using one or both of the buffer mixtures of the series consisting of disodium carbonate/sodium hydroxide and sodium hydrogen carbonate/sodium hydroxide, or of one or both of the buffer mixtures of the series consisting of disodium hydrogen phosphate/sodium hydroxide and sodium dihydrogen phosphate/sodium hydroxide.

A particularly preferred embodiment of the process of this invention comprises using, based on the molar amount of the diazo component of formula (2), the 0.1- to 1-fold, more particularly the 0.2- to 0.6-fold, molar amount of disodium carbonate and/or sodium hydrogen carbonate, or the 0.1- to 1-fold, more particularly the 0.2- to 0.6-fold, molar amount of disodium hydrogen phosphate and/or sodium dihydrogen phosphate.

A preferred embodiment of the process of this invention comprises adjusting the pH to a value in the range from 8.5 to 11.5 immediately before the coupling of the solution/suspension which contains the diazo component of formula (2), alkali metal chloride and the acid component of one or more buffer mixtures. This adjustment is made preferably with the appropriate basic component of the buffer mixtures employed.

In the above preferred embodiment of the process of this invention, both components (acid and basic component) of a buffer mixture will always be used. The terms "acid" and "basic" with reference to a component of a buffer mixture will be understood throughout this specification as relating to the second component of said buffer mixture. Typical acid components of a buffer mixture are the components disodium carbonate, sodium hydrogen carbonate, disodium hydrogen phosphate, sodium dihydrogen phosphate, borax, sodium borate and hydrochloric acid of the buffer mixtures disodium carbonate/sodium hydroxide, sodium hydrogen carbonate/sodium hydroxide, disodium hydrogen phosphate/sodium hydroxide, sodium dihydrogen phosphate/sodium hydroxide, borax/sodium hydroxide, sodium borate/sodium hydroxide, veronal sodium/hydrochloric acid.

The appropriate basic components of the above buffer mixtures are sodium hydroxide and veronal sodium.

A particularly preferred embodiment of the process of this invention comprises adjusting the pH with sodium hydroxide to a value in the range from 8.5 to 11.5 immediately before the coupling of the solution/suspension which contains the diazo component of formula (2), sodium chloride and disodium carbonate and/or sodium hydrogen carbonate, or which contains the diazo component of formula (2), sodium chloride and disodium hydrogen phosphate and/or sodium dihydrogen phosphate.

A further preferred embodiment of the process of the invention comprises adding to the solution/suspension which contains the diazo component of formula (2), alkali metal chloride and the acid component of one or more buffer mixtures, a solution/suspension which contains the coupling component of formula (3) and the appropriate basic component of the buffer mixture or mixtures employed.

In the above preferred embodiment of the process of the invention, both components (acid and basic component) of a buffer mixture are always used.

A further particularly preferred embodiment of the process of this invention comprises adding to the solution/suspension which contains the diazo component of formula (2), sodium chloride and disodium carbonate and/or sodium hydrogen carbonate, or which contains the diazo component of formula (2), sodium chloride and disodium hydrogen phosphate and/or sodium dihydrogen phosphate, a solution/suspension which contains the coupling component of formula (3) and sodium hydroxide.

A very particularly preferred embodiment of the process of the invention comprises neutralising the solution/suspension which contains the diazo component of formula (2), the 5- to 15-fold molar amount, more particularly the 6- to 9-fold molar amount, of sodium chloride, based on the molar amount of said diazo component of formula (2), the 0.1- to 1-fold molar amount, more particularly the 0.2- to 0.6-fold molar amount, based on the molar amount of said diazo component of formula (2), of one or both compounds of the series disodium carbonate and sodium hydrogen carbonate or of one or both compounds of the series disodium hydrogen phosphate and sodium dihydrogen phosphate, adjusting the pH immediately before the coupling to a value in the range from 8.5 to 11.5, preferably from 9 to 10, with NaOH, and then running in the solution of the coupling component of formula (3), which has been adjusted with NaOH to a pH in the range from 9 to 13, as rapidly as possible at an initial temperature of at least 40° C.

An interesting embodiment of the process of the invention comprises adding to the solution/suspension which contains the diazo component of formula (2) and sodium hydroxide, a solution/suspension which contains the coupling component of formula (3) and disodium carbonate and/or sodium hydrogen carbonate, or which contains the coupling component of formula (3) and disodium hydrogen phosphate and/or sodium dihydrogen phosphate. This embodiment is particularly advantageous for rapidly coupling compounds such as 5-pyrazolone coupling components.

The process of this invention is normally carried out as a continuous process. If the process is carried out non-continuously, it has been found convenient to make the addition of the solution of the coupling component to the solution of the diazo component as rapidly as possible (tipping in).

A further preferred embodiment of the process of the invention comprises carrying out the coupling in the temperature range from 40° to 75° C. The coupling is preferably carried out adiabatically, in which case an initial temperature of at least 40° C. has been found especially advantageous.

Upon completion of coupling, the azo dye of formula (1) can be further processed direct without additional purification, for example by metallising it to a metal complex dye. If it is desired to isolate the dye of formula (1), it has been found useful to heat the coupling mixture briefly, for example to a temperature of 60° to 90° C. to give a readily filterable form of the coupling product.

The diazo components of formula (2) which can be used in the process of this invention are preferably 1-diazo-2-hydroxynaphthalene-4-sulfonic acid and 1-diazo-6-nitro-2-hydroxynaphthalene-4-sulfonic acid. The diazo components of formula (2) are known and are prepared by known methods.

The coupling components of formula (3) are known and are prepared by known methods. In the process of this invention it is preferred to use coupling components which belong to the benzene or naphthalene series or to the 5-pyrazolone, hydroxyquinoline or acetoacetarylide or benzoylacetic acid series.

In addition to being substituted by the hydroxyl group, the coupling components of formula (3) can additionally be substituted by the following substituents: $C_1$–$C_6$alkyl, $C_1$–$C_6$alkoxy, $C_2$–$C_6$alkanoylamino, $C_1$–$C_6$alkoxycarbonylamino, phenyl, amino, halogen, sulfo, sulfonamido and sulfone groups, and the phenyl radical can be further substituted by the above mentioned substituents.

$C_2$–$C_6$alkanoylamino is typically acetylamino, propionylamino and butyrylamino.

$C_1$–$C_6$Alkoxycarbonylamino is typically methoxycarbonylamino and ethoxycarbonylamino.

$C_1$–$C_6$Alkyl is typically methyl, ethyl, propyl, isopropyl, butyl, sec-butyl, tert-butyl, isobutyl, pentyl and hexyl.

$C_1$–$C_6$Alkoxy is typically methoxy, ethoxy, propoxy, isopropoxy and butoxy.

Halogen is typically fluoro, bromo and, preferably, chloro.

Sulfonamido is typically —$SO_2NH_2$, $SO_2NHC_1$–$C_6$alkyl such as —$SO_2NHCH_3$ and —$SO_2NHC_2H_5$ and —$SO_2N(C_1$–$C_6$alkyl$)_2$ such as —$SO_2N(CH_3)_2$ and —$SO_2N(C_2H_5)_2$ as well as

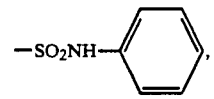

and the phenyl radical may be substituted for example by sulfo or carboxy.

The sulfone group is typically —$SO_2$—$C_1$–$C_6$alkyl such as —$SO_2$—$CH_3$ and —$SO_2$-aryl such as phenylsulfonyl.

A particularly preferred embodiment of the process of this invention comprises using a coupling component of formula (3), wherein K is a radical of the benzene or naphthalene series or a 1-phenyl-3-methylpyrazol-5-one radical which may carry one to three of the above mentioned substituents. K is preferably the naphthyl radical.

Particularly suitable coupling components are phenols which are substituted by $C_1$–$C_6$alkyl and/or $C_1$–$C_6$alkanoylamino, $C_1$–$C_6$alkoxycarbonylamino and, preferably, naphthols which may be substituted by chloro, $C_2$–$C_6$alkanoylamino, $C_1$–$C_6$alkoxycarbonylamino, sulfo, sulfonamido or sulfone groups, for example 4-methylphenol, 4-tert-butylphenol, 2,4-dimethylphenol, 2-acetylamino-4-methylphenol, 1- or 2-naphthol, 1-naphthol-3-, -4- or -5-sulfonic acid, 2-naphthol-3-, -4-, -5-, -6-, -7- or -8-sulfonic acid, 2-naphthol-6-sulfamide, 1-acetylamino-7-naphthol, 1-acetylamino-6-naphthol, 1-propionylamino-7-naphthol and 1-carbomethoxyamino-7-naphthol. As coupling component of formula (3) it is preferred to use: 1-naphthol, 2-naphthol, 5,8-dichloro-1-naphthol, 1-naphthol-5-sulfonic acid, 8-acetylamino-2-naphthol, 6-acetylamino-2-naphthol-4-sulfonic acid, 1-phenyl-3-methylpyrazol-5-one, 6-amino-1-naphthol-3-sulfonic acid or 4-tert-butylphenol.

A particularly important embodiment of the process of this invention comprises adding the 5- to 15-fold molar amount, preferably the 6- to 9-fold molar amount, based on the molar amount of the diazo component, of sodium chloride to 1-diazo-6-nitro-2-hydroxynaphthalene-4-sulfonic acid in aqueous solution, neutralising the solution with NaOH and, immediately before coupling, adding the 0.1 to 1-fold molar amount, preferably the 0.2- to 0.6-fold molar amount, based on the molar amount of the diazo component, of one or both compounds of the series disodium carbonate and sodium hydrogen carbonate, or of one or both compounds of the series disodium hydrogen phosphate and sodium dihydrogen phosphate, and then running in the solution of β-naphthol, which has been adjusted with NaOH to a pH value in the range from 9 to 13, as rapidly as possible at an initial temperature of at least 40° C.

The azo dyes obtained by the process of this invention are suitable for the preparation of metal complex dyes, for example chromium or cobalt complex azo dyes, the metallising being carried out by known methods.

In the following Examples parts are by weight and the relationship between parts by weight and parts by volume is the same as that between the gram and the cubic centimeter.

EXAMPLE 1

14.75 parts of 1-diazo-6-nitro-2-hydroxynaphthalene-4-sulfonic acid are added to 150 parts of water. Then 20 parts of sodium chloride are added and the pH is adjusted to the neutral point with a 50% aqueous NaOH solution, whereupon the temperature rises to ca. 42° C. Then 2 parts of sodium dihydrogen phosphate, predissolved in the minimum amount of water, are added, followed by the immediate addition of a solution prepared as follows: 7.5 parts of 2-naphthol are added to and dissolved in 50 parts of warm water of 60° C. with 1.9 parts of NaOH, such that the pH is adjusted to ca. 12, and then 7.5 parts of sodium chloride are added and the reaction mixture is immediately well stirred. The temperature of the reaction mixture is ca. 50° C. and the pH falls to a value in the range from 9.8 to 10.3. The coupling is complete after 5 to 10 minutes. The coupling product is adjusted to pH 7 with 32% hydrochloric acid and filtered at 80° C. The yield is ca. 91 to 92% of theory.

EXAMPLE 2

The procedure of Example 1 is repeated, using 2 parts of disodium carbonate in place of 2 parts of sodium dihydrogen phosphate and dissolving 2-naphthol with 1.7 instead of 1.9 parts of NaOH. The same dye is obtained in a yield of ca. 90% of theory.

EXAMPLES 3-6

The procedure of Example 1 is repeated, using in place of 2 parts of sodium dihydrogen phosphate an equimolar amount of sodium hydrogen carbonate, disodium hydrogen phosphate, disodium carbonate/sodium hydrogen carbonate in the molar ratio 1:1, or disodium hydrogen phosphate/sodium dihydrogen phosphate in the molar ratio 1:1, and, instead of 1.9 parts of NaOH, the amount of NaOH required to adjust the pH of the reaction mixture to a value in the range from 9.8 to 10.3. The same dye is obtained.

EXAMPLES 7 and 8

The procedure of Example 1 or 2 is repeated, using in place of 1-diazo-6-nitro-2-hydroxynaphthalene-4-sulfonic acid an equimolar amount of 1-diazo-2-hydroxynaphthalene-4-sulfonic acid, to give a dye in the same high yield after a comparably short residence time in the coupling vessel.

EXAMPLE 9

37.5 parts of 1-diazo-2-naphthol-4-sulfonic acid are added to 170 parts of water and the pH of the mixture is adjusted with a 50% NaOH solution to the neutral point, whereupon the temperature rises to 30°-35° C. A separately prepared solution of 18.4 parts of 1-phenyl-3-methyl-5-pyrazolone in 110 parts of water with the addition of 8 parts of a 50% NaOH solution is then added over 5 minutes, and 4 parts of sodium dihydrogen phosphate are added and the reaction mixture is well stirred. The temperature of the reaction mixture is ca. 35° C. and the pH is ca. 10. If the pH falls below 9.7, it is adjusted to 10 with a 50% NaOH solution. The coupling product is adjusted to pH 7 with 32% hydrochloric acid and filtered at 80° C.

EXAMPLE 10

The procedure of Example 9 is repeated, using 7.5 parts of a 50% NaOH solution and 4 parts of disodium carbonate in place of 8 parts of 50% NaOH solution and 4 parts of sodium dihydrogen phosphate, to give the same dye.

Monoazo dyes which can be further processed direct to the metal complex without prior separation or without purification are obtained by following the procedure as described in Example 1 or 9, using as diazo component an equimolar amount of the diazo component indicated in column 2 of the following Table and using, in place of the coupling component, an equimolar amount of the coupling components listed in column 3 of the Table.

TABLE

| Example | Diazo component | Coupling component |
|---------|-----------------|--------------------|
| 11 | $^{\ominus}O_3S$—[naphthalene with OH and $N_2^{\oplus}$] | [1-naphthol] |

TABLE-continued

| Example | Diazo component | Coupling component |
|---|---|---|
| 12 | 4-sulfo-1-diazo-2-hydroxynaphthalene (⊖O₃S, OH, N₂⊕ on naphthalene) | 1-hydroxy-4,5-dichloronaphthalene |
| 13 | 4-sulfo-1-diazo-2-hydroxynaphthalene | 5-hydroxynaphthalene-1-sulfonic acid |
| 14 | 4-sulfo-1-diazo-2-hydroxynaphthalene | 8-acetylamino-2-hydroxynaphthalene (CH₃—CONH, OH) |
| 15 | 4-sulfo-1-diazo-2-hydroxynaphthalene | 7-acetylamino-3-hydroxynaphthalene-1-sulfonic acid (NH—CO—CH₃, OH, SO₃H) |
| 16 | 4-sulfo-1-diazo-2-hydroxynaphthalene | 1-phenyl-3-methyl-5-pyrazolone type (phenyl-N=N, C=O, CH₃) |
| 17 | 4-sulfo-1-diazo-2-hydroxy-6-nitronaphthalene (⊖O₃S, OH, N₂⊕, O₂N) | 1-phenyl-3-methyl-5-pyrazolone type |

TABLE-continued
| Example | Diazo component | Coupling component |
|---|---|---|
| 18 | 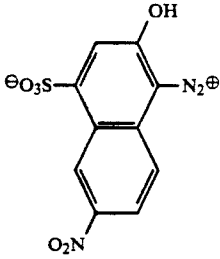 | 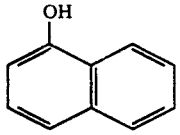 |
| 19 | 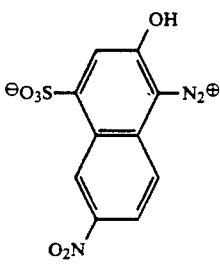 | 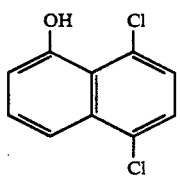 |
| 20 | 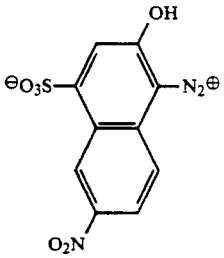 | 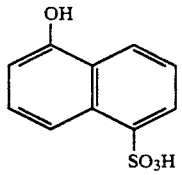 |
| 21 | 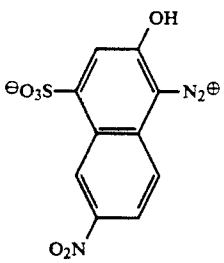 | 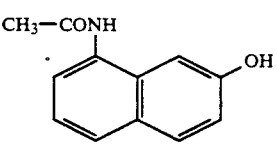 |
| 22 | 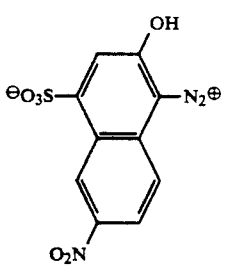 | 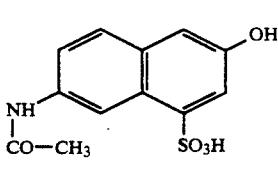 |
| 23 | 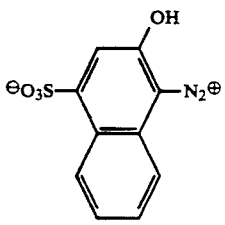 | 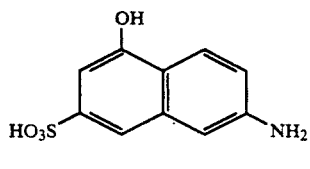 |

TABLE-continued

| Example | Diazo component | Coupling component |
|---|---|---|
| 24 | 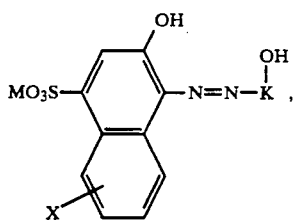 | |
| 25 | | |
| 26 | 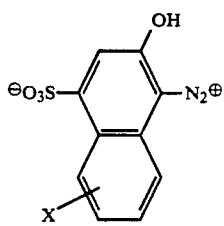 | |

The resultant dyes can be further processed to the metal complex without prior separation or without purification, i.e. the steps of adjusting the pH to the neutral point, heating to 80° C. and filtration can be dispensed with.

What is claimed is:

1. A process for the preparation of an azo dye of formula

wherein K is a benzene or naphthalene radical, and the hydroxy group is attached to K adjacent to the azo group, X is hydrogen or nitro and M is an alkali metal ion, which process comprises coupling a diazo component of formula in the presence of one or more buffer mixtures, excepting the buffer mixture ammonium chloride/ammonia, and in the presence of an alkali metal chloride, to a coupling component of formula $$\underset{HK}{OH} \quad (3)$$

in which formulae (2) and (3) K and X are as defined for formula (1).

2. A process according to claim 1, wherein the coupling is carried out in the presence of one or more buffer mixtures selected from the series consisting of disodium carbonate/sodium hydroxide, sodium hydrogen carbonate/sodium hydroxide, disodium hydrogen phosphate/sodium hydroxide, sodium dihydrogen phosphate/sodium hydroxide, borax/sodium hydroxide, borax/hydrochloric acid, sodium borate/sodium hydroxide, sodium borate/hydrochloric acid, borax/boric acid, disodium carbonate/boric acid, boric acid/sodium hydroxide, veronal sodium/hydrochloric acid, glycocoll/sodium hydroxide, tris(hydroxymethyl)aminomethane/hydrochloric acid, a Britton-Robinson stock solution/sodium hydroxide, a Teorell-Stenhagen stock solution/hydrochloric acid, and potassium dihydrogen phosphate/borax.

3. A process according to claim 1, wherein the coupling is carried out in the presence of one or both buffer mixtures of the series consisting of disodium carbonate/sodium hydroxide and sodium hydrogen carbonate/sodium hydroxide, or in the presence of one or both buffer mixtures of the series consisting of disodium hydrogen phosphate/sodium hydroxide and sodium dihydrogen phosphate/sodium hydroxide.

4. A process of claim 1 wherein the alkali metal chloride is sodium chloride.

5. A process according to claim 1, wherein the coupling is carried out in the presence of the 5- to 15-fold molar amount of alkali metal chloride, based on the molar amount of the diazo component of formula (2).

6. A process of claim 5 wherein the coupling is carried out in the presence of a 6- to 9-fold molar amount of alkali metal chloride.

7. A process of claim 1 wherein the coupling is carried out in the presence of a 0.1- to 1-fold molar amount, relative to the diazo component of formula (2), of a carbonate or a mixture of carbonates selected from the group consisting of disodium carbonate and sodium hydrogen carbonate or of a phosphate or mixture of phosphates selected from the group consisting of sodium hydrogen phosphate and sodium dihydrogen phosphate.

8. A process of claim 7 wherein the carbonate or mixture of carbonates or the phosphate or mixture of phosphates is present in a 0.2- to 0.6-fold molar amount.

9. A process according to claim 1, wherein the pH is adjusted to a value in the range from 8.5 to 11.5 immediately before the coupling of the solution/suspension which contains the diazo component of formula (2), alkali metal chloride and the acid component of one or more buffer mixtures.

10. A process according to claim 9, wherein the pH is adjusted with a basic component of the buffer mixture or mixtures employed.

11. A process according to claim 9, wherein the pH is adjusted with sodium hydroxide to a value in the range from 8.5 to 11.5 immediately before the coupling of the solution/suspension which contains the diazo component of formula (2), sodium chloride and disodium carbonate and/or sodium hydrogen carbonate, or which contains the diazo component of formula (2), sodium chloride and disodium hydrogen phosphate and/or sodium dihydrogen phosphate.

12. A process according to claim 1, which comprises adding to the solution/suspension which contains the diazo component of formula (2), alkali metal chloride and the acid component of one or more buffer mixtures a solution/suspension which contains the coupling component of formula (3) and a basic component of the buffer mixture or mixtures employed.

13. A process of claim 12, which comprises adding a solution/suspension which contains the coupling component of formula (3) and sodium hydroxide to a solution/suspension which contains the diazo component of formula (2), sodium chloride and a carbonate or a mixture of carbonates selected from the group consisting of disodium carbonate and sodium hydrogen carbonate or a phosphate or mixture of phosphates selected from the group consisting of sodium hydrogen phosphate and sodium dihydrogen phosphate.

14. A process of claim 1, which comprises adding a solution/suspension which contains the diazo component of formula (2), sodium chloride and a carbonate or a mixture of carbonates selected from the group consisting of disodium carbonate and sodium hydrogen carbonate or a phosphate or mixture of phosphates selected from the group consisting of sodium hydrogen phosphate and sodium dihydrogen phosphate to a solution/suspension which contains the coupling component of formula (3) and sodium hydroxide.

15. A process according to claim 1, wherein the coupling is carried out adiabatically.

16. A process according to claim 1, wherein K is a benzene or naphthalene radical which may be substituted by $C_1$–$C_6$alkyl, $C_1$–$C_6$alkoxy, $C_2$–$C_6$alkanoylamino, $C_1$–$C_6$alkoxycarbonylamino, phenyl, amino, halogen, sulfo, sulfonamido and sulfone groups.

17. A process according to claim 16, wherein the coupling component of formula (3) is 1-naphthol, 2-naphthol, 5,8-dichloro-1-naphthol, 1-naphthol-5-sulfonic acid, 8-acetylamino-2-naphthol, 6-acetylamino-2-naphthol-4-sulfonic acid, 6-amino-1-naphthol-3-sulfonic acid or 4-tert-butylphenol.

18. A process according to claim 1, which comprises the use of a coupling component of formula (3), wherein K is the naphthyl radical.

* * * * *